(12) United States Patent
Arroyo

(10) Patent No.: US 8,055,227 B2
(45) Date of Patent: Nov. 8, 2011

(54) DYNAMIC TUNING BETWEEN DIFFERENT RECEIVERS BACKGROUND

(75) Inventor: Bernal Antonio Arroyo, San Jose, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 666 days.

(21) Appl. No.: 11/990,056

(22) PCT Filed: Aug. 22, 2006

(86) PCT No.: PCT/US2006/032942
§ 371 (c)(1),
(2), (4) Date: Feb. 5, 2008

(87) PCT Pub. No.: WO2007/024967
PCT Pub. Date: Mar. 1, 2007

(65) Prior Publication Data
US 2009/0113488 A1      Apr. 30, 2009

Related U.S. Application Data

(60) Provisional application No. 60/710,832, filed on Aug. 24, 2005.

(51) Int. Cl.
*H04B 17/00* (2006.01)
(52) U.S. Cl. ............. 455/226.1; 455/132; 455/161.3; 455/226.2; 455/226.3
(58) Field of Classification Search ........... 455/226.1, 455/132, 161.3, 226.2, 226.3, 67.11, 67.13, 455/130, 133–135, 150.1, 160.1, 161.1, 224, 455/225, 230, 277.2, 278.1, 296, 513, 526, 455/550.1
See application file for complete search history.

(56) References Cited

U.S. PATENT DOCUMENTS

| | | | |
|---|---|---|---|
| 5,930,231 A * | 7/1999 | Miller et al. | 370/210 |
| 6,188,447 B1 | 2/2001 | Rudolph et al. | |
| 6,577,353 B1 * | 6/2003 | Welles et al. | 348/706 |
| 7,038,733 B2 * | 5/2006 | Dent | 348/614 |
| 7,120,404 B2 * | 10/2006 | Gierl | 455/132 |
| 7,539,469 B2 * | 5/2009 | Zahm et al. | 455/130 |
| 7,685,622 B2 | 3/2010 | Stewart | |
| 7,701,515 B2 * | 4/2010 | Gomez et al. | 348/731 |
| 7,747,232 B2 * | 6/2010 | Gierl | 455/132 |
| 2003/0142234 A1 | 7/2003 | Dent | |

FOREIGN PATENT DOCUMENTS

| | | |
|---|---|---|
| JP | 9321581 A | 12/1997 |
| JP | 200760624 A | 3/2007 |
| JP | 2007060624 A | 3/2007 |
| WO | WO2004054171 | 6/2004 |

OTHER PUBLICATIONS

Search Report dated Feb. 2, 2007.

* cited by examiner

*Primary Examiner* — Pablo N Tran
(74) *Attorney, Agent, or Firm* — Robert D. Shedd; Jeffrey M. Navon

(57) ABSTRACT

Methods of operating a mobile television receiver. The methods comprise the steps of gathering data concerning parameters of an input signal, determining whether the signal is at a level, and performing additional functions if it is determined that the signal is at the level. Determining the signal level includes determining one of signal-to-noise ratio, bit error rate, signal strength and uncorrected packet count. Performing additional functions comprises scanning a frequency space of the signal.

8 Claims, 5 Drawing Sheets

DYNAMIC TUNING BETWEEN DIFFERENT RECEIVERS BACKGROUND

This application is a National Stage Application and claims the benefit, under 35 U.S.C. §365 of International Application PCT/US2006/032942 filed Aug. 22, 2006, which was published in accordance with PCT Article 21(2) on Mar. 1, 2007 in English, and which claims the benefit of United States Provisional Patent Application No. 60/710,832 filed on Aug. 24, 2005.

BACKGROUND

1. Field of the Invention

The present invention relates to terrestrial Television networks. More particularly, it relates to the mobile set-top boxes for acquisition of digital terrestrial television programs in the presence of multiple transmission areas and to a mobile television receiver which can tune in diversity mode, and also in non-diversity mode.

2. Description of the Prior Art

Terrestrial television (also known as over-the-air, OTA or broadcast television) was the traditional method of television broadcast signal delivery prior to the advent of cable and satellite television. Although still in wide use, in some countries it is slowly becoming obsolete but in others, digital terrestrial has become popular. It works via radio waves transmitted through open space, usually unencrypted (commonly known as "free-to-air" television).

Terrestrial television broadcasting dates back to the very beginnings of television as a medium itself with the first long-distance public television broadcast from Washington, D.C., on Apr. 7, 1927. Aside from transmission by high-flying planes moving in a loop using a system developed by Westinghouse called Stratovision, there was virtually no other method of television delivery until the 1950s with the advent of cable television, or community antenna television (CATV). The first non-terrestrial method of delivering television signals that in no way depended on a signal originating from a traditional terrestrial source began with the use of communications satellites during the 1960s and 1970s.

In the United States and most of the rest of North America as well, terrestrial television underwent a revolutionary transformation with the eventual acceptance of the NTSC standard for color television broadcasts in 1953. Later, Europe and the rest of the world either chose between the later PAL and SECAM color television standards, or adopted NTSC.

In addition to the threat from CATV, analog terrestrial television is now also subject to competition from satellite television and distribution of video and film content over the Internet. The technology of digital terrestrial television has been developed as a response to these challenges. The rise of digital terrestrial television, especially HDTV, may mark an end to the decline of broadcast television reception via traditional receiving antennas, which can receive over-the-air HDTV signals.

In North America, terrestrial broadcast television operates on TV channels 2 through 6 (VHF-low band, known as band I in Europe), 7 through 13 (VHF-high band, known as band III elsewhere), and 14 through 69 (UHF television band, elsewhere bands IV and V). Channel numbers represent actual frequencies used to broadcast the television signal. Additionally, television translators and boosters can be used to rebroadcast a terrestrial TV signal using an otherwise unused channel to cover areas with marginal reception.

In Europe, a planning conference ("ST61") held under the auspices of the International Telecommunications Union in Stockholm in 1961 allocated frequencies the Bands IV and V for the first time for broadcast television use. It also superseded the 1951 Plan (also made in Stockholm) which had first allocated Band II frequencies for FM radio and Band III frequencies for television.

Following the ST61 conference, UHF frequencies were first used in the UK in 1964 with the introduction of BBC2. Television broadcasting in Band III continued after the introduction of four analogue programmes in the UHF bands until the last VHF transmitters were switched off on Jan. 6, 1985. The success of terrestrial analogue television across Europe varies from country to country. Although each country has rights to a certain number of frequencies by virtue of the ST61 plan, not all of them have been bought into service.

By the mid 1990s, the interest in digital television across Europe was such the CEPT convened the "Chester '97" conference to agree means by which digital television could be inserted into the ST61 frequency plan. The introduction of digital television in the late 1990s and early years of the 21st century led the ITU to call a Regional Radio Communications Conference to abrogate the ST61 plan and to put a new plan for digital broadcasting only in its place.

By the year 2012, the EU will be entirely switched to digital terrestrial television broadcasting. Some EU member states have decided to complete this switchover as early as 2008 (e.g. Sweden). These digital terrestrial television broadcasting networks are multi-frequency networks (MFN). In this configuration, each given service is transmitted at a different frequency throughout the coverage area. Within each multiplex there are normally 8-12 services. Examples of services in the UK are BBC One, ITV1, Sky Travel and BBC Radio 1.

With this new age of digital terrestrial television networks, mobile television devices will not only become more popular, they will inherently require additional capabilities to provide the seamless flow of information to the end user without drop out or other interference that may be caused by traveling through multiple transmission areas. The new age of digital terrestrial networks will also require that mobile set-top boxes be created to receive mobile, digital television signals. In the past, Digital Video Broadcast-Terrestrial ("DVB-T") could only be received by non-mobile set-top boxes, and as such could not be received in environments which required mobility. In the past, attempts to build mobile video device have utilized a traditional single DVB-T demodulator. Other attempts have utilized built-in car mobile video devices where the set-top box with a diversity demodulator is in the trunk, there are two antennas on the roof, and a large liquid crystal display ("LCD") screen is built into the car. Thus, while diversity tuning has been known in the art especially for FM tuning, there has not heretofore been designed a diversity tuned, mobile set-top box.

However, diversity is not needed all the time. There are times during the operation of the system when signal reception is acceptable using only one receiver. The quality of these signals is subject to change as the unit moves. Moreover, scanning the frequency range allows the system to gather information about potential useful signals. This in turn allows the system to anticipate what channel to jump to when (and if) the current signal becomes degraded. This enhances user experience, as it provides for continuity of service as the uses watches a particular channel.

SUMMARY OF THE INVENTION

The aforementioned long-felt needs are met, and problems solved, by methods of operating a receiver provided in accordance with the present invention. The methods comprise the steps of gathering data concerning parameters of an input signal, determining whether the signal is at a level, and performing additional functions if it is determined that the signal is at the level.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION

It is to be understood that the present principles may be implemented in various forms of hardware, software, firmware, special purpose processors, or a combination thereof. Preferably, the present principals are implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s).

The computer platform also includes an operating system and microinstruction code. The various processes and functions described herein may either be part of the microinstruction code or part of the application program (or a combination thereof) that is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present principles is programmed. Given the teachings herein, one of ordinary skill in the related art will be able to contemplate these and similar implementations or configurations of the present principles.

The present invention is generally related to set-top boxes. However, the invention may be implemented in any handheld or otherwise portable devices, for example computers, PDAs, personal media players, and all other devices that are adapted to receive digital video signals and which are mobile. These terms are used interchangeably throughout, and are referred to generally as mobile video devices.

Figure 1:
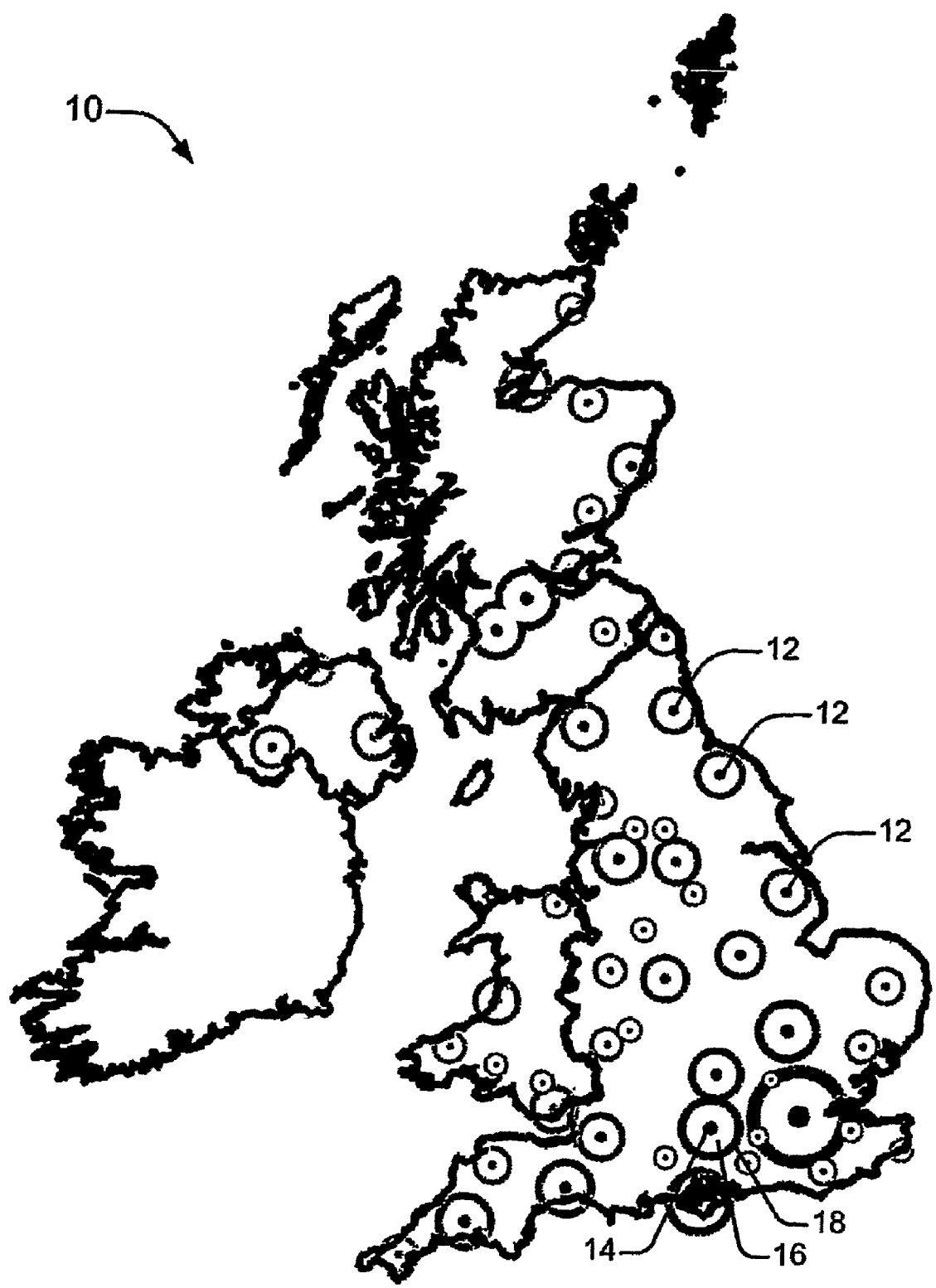
FIG. 1 is a diagrammatic representation of the United Kingdom showing an exemplary transmitter coverage map for a digital terrestrial television network in which the present principles may be implemented.

FIG. 1 shows a geographic map 10 of the United Kingdom (UK). The use of the geographic region of the UK is shown here for exemplary purposes only. Those of skill in the art will recognize that the concepts and principles disclosed herein can be applied to any digital terrestrial network in any geographic area without departing from the spirit of the same. Generally speaking, the country or geographic area is covered by a plurality of transmitters 12, and the transmitters 12 are dispersed throughout the geographic area such that the coverage area of some overlap, while others do not. The topological map of FIG. 1 can be stored as a static topological cell database that can be used as reference when transitioning from one transmission area to another.

By way of example, each transmitter 12 has as particular power rating and as such have different coverage areas. As would be expected, the signal reception area is strongest at the center 14, and dissipates concentrically from the transmitter so as to form two other regions 16 and 18, where the strength of the particular transmitter's signals is weaker and requires additional antenna strength. In the UK example provided herein, each transmitter 12 includes 6 multiplexes (1, 2, A, B, C and D). Each multiplex is transmitted at a different frequency from the other 5 multiplexes on the same transmitter and from adjacent transmitters. Each multiplex carries 8-12 services (e.g., TV, radio, and interactive services).

Thus, when a mobile video device moves toward the outer regions of a particular transmission cell/area (i.e., the weaker signal strength portions of the particular transmission cell/area), the mobile TV or other video device must be capable of identifying the changing frequencies in adjacent transmitter sites for the same channel, so as to avoid signal drop out or other interference that may be caused by traveling through multiple transmission areas. The method of the present principles addresses and resolves this potential problem with mobile acquisition of digital terrestrial TV programs in the presence of multiple transmission areas.

DVB-T compliant digital television transmission signals contain service information (SI) that maps programming and content to frequencies within the physical transmission region or network. Tuning to various frequencies and extracting digital channel information (called PIDS) allows audio and video for television programs to be displayed on a television or other video device (e.g., mobile video devices).

Programs are identified by the service ID. Thus, knowing the service ID not only allows the SI tables (or maps) to be navigated, but also enables the identification of the frequency on which the service is played and the digital channel information to be determined, so that the program can be decoded and displayed.

In the presence of multiple transmission cells (areas), as is the case with mobile video devices, a particular program may be found on different frequencies with different digital channel information in the different transmission cells. Using a combination of static topological information and dynamic SI information within the stream, the method and system of the present principles enables a quick determination of the required information to play the program when transitioning from one cell to the next.

In order to achieve this, the service information embedded in the digital stream is divided into two types: 1) Quasi-Static Network and Service information, and 2) dynamic program service information (PSI). The Quasi-Static Network and Service information describes the transmission network and service-to-frequency mapping. The dynamic PSI describes digital channel information in order to play the programming. Since the first type of information is relatively static (i.e., geographical information about the respective transmitting cells), a topological map of all transmission cells or areas within the target television market can be compiled. This map describes all of the transmission cells, the services they provide, the frequencies they transmit and, most importantly, how they overlap.

When transitioning from one transmission cell to the next, the topological map can be used to probe all of the transmission cells (e.g., scan the airwaves) that overlap with the current one to quickly determine which cell the device will be moving into. This allows the device to determine on what frequency, in the new transmission cell, that the program may be found. Once the frequency is known, the dynamic PSI information can be quickly probed to determine the digital channel information for the program. At this point the program can now be played in the new transmission cell.

Figure 2:
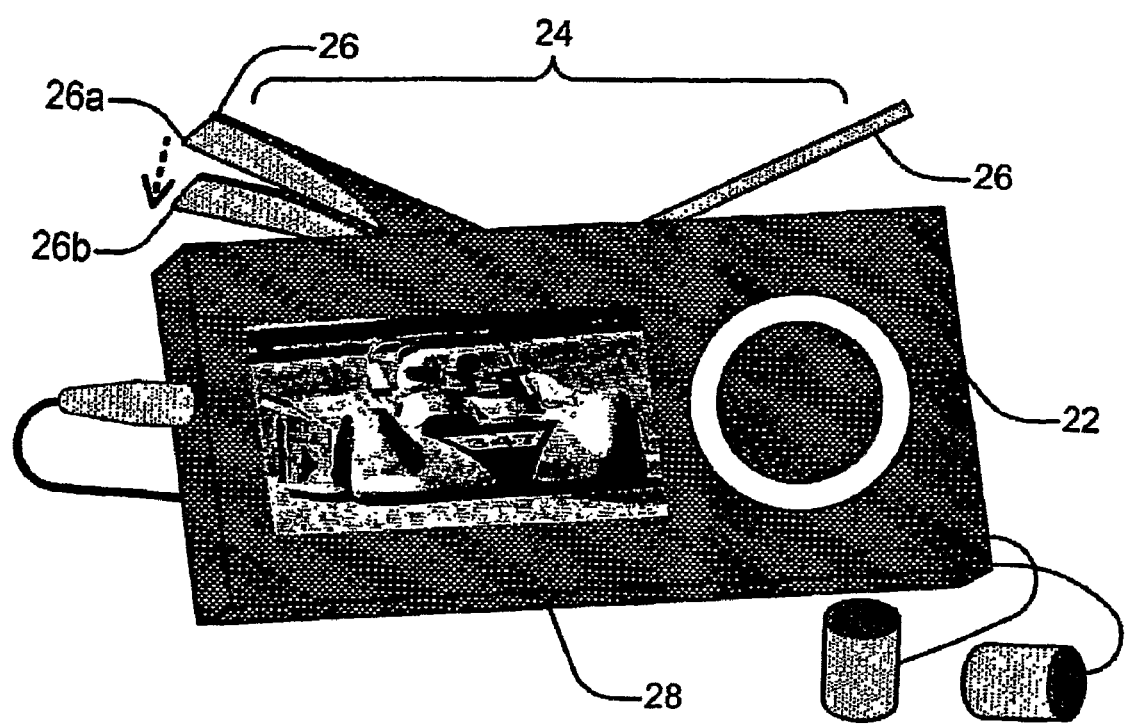
FIG. 2 is an isometric view diagram of a digital set-top box, according to an aspect of the present invention.

Referring now to FIG. 2, an isometric view of a preferred embodiment of a mobile video device in accordance with the invention is shown generally at 20. Device 20 comprises housing 22 which contains all of the relevant circuitry, hardware and other necessary elements. As will be described in more detail below, device 20 further comprises a demodulator having a plurality of tuning circuits. An antenna 24 is interfaced to the housing 22, and further to the internal circuitry of device 20. The antenna comprises at least one antenna element 24, and preferably a plurality of antenna elements 26, as shown, for receiving the digital signals and which input modulated signals to the demodulator for further processing by device 20 as will also be described in more detail below. More preferably, the antenna elements 26 are reticulatable with housing 20, which means that they move with respect to housing 20 from an extended or first position 26a to a retracted or second position 26b. When retracted 26b, the antenna elements 26 are storable in the housing 20, and when reticulated 26a, the antenna elements 26 are in a final position from which the antenna elements may best be able to direct modulated signals to the demodulator. Even more preferably, an optional screen 28 may be interfaced to the mobile device 20 in the housing 22 on which video images may be displayed. Screen 28 is preferably a LCD screen. As will be recognized by those with skill in the art, speakers (not shown) may also be interfaced to housing 22 for playing audio received in the modulated signal stream.

Figure 3A:
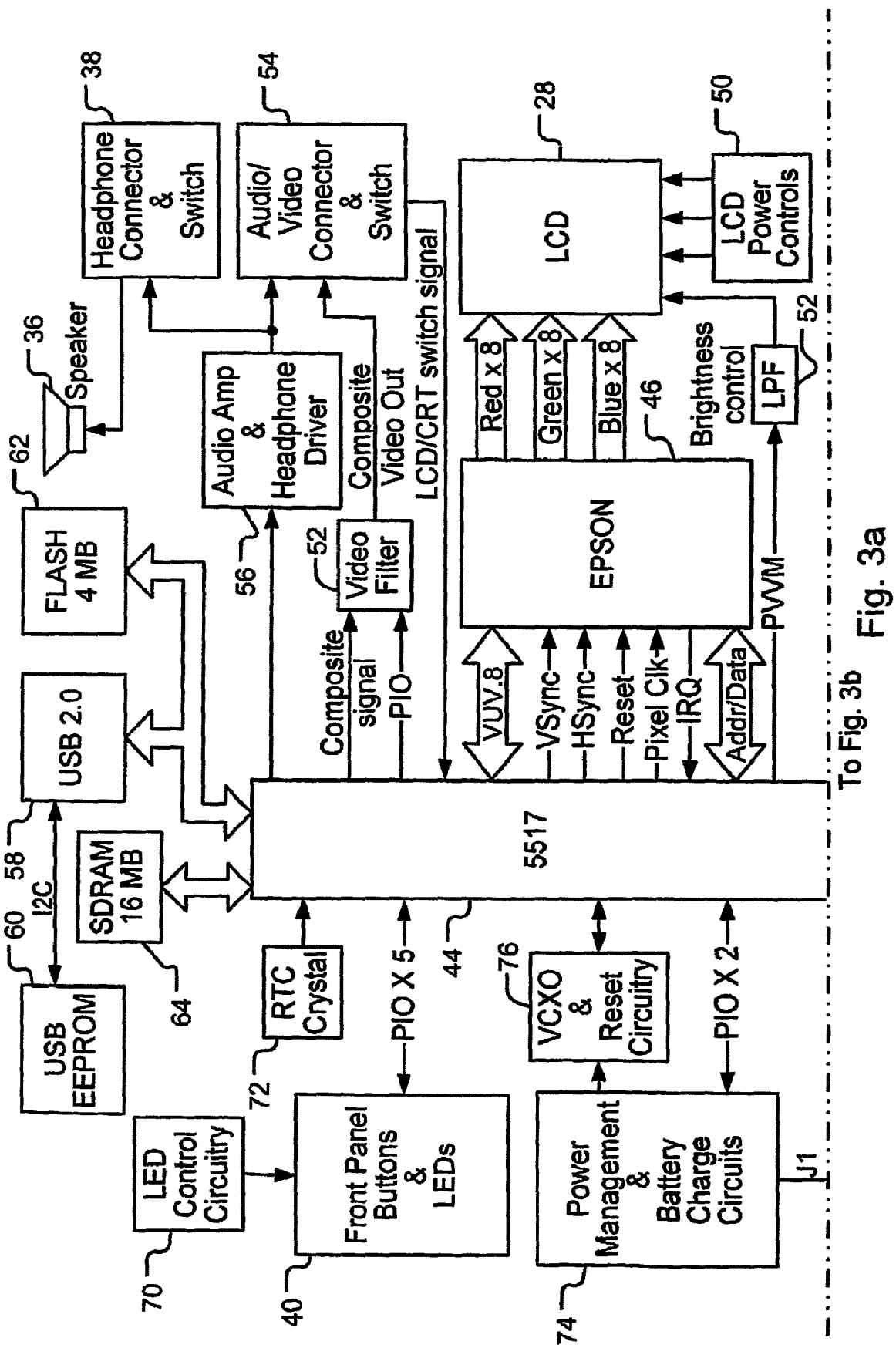
FIG. 3 is block diagram of a set-top box according to another aspect of the present invention.
Figure 3B:
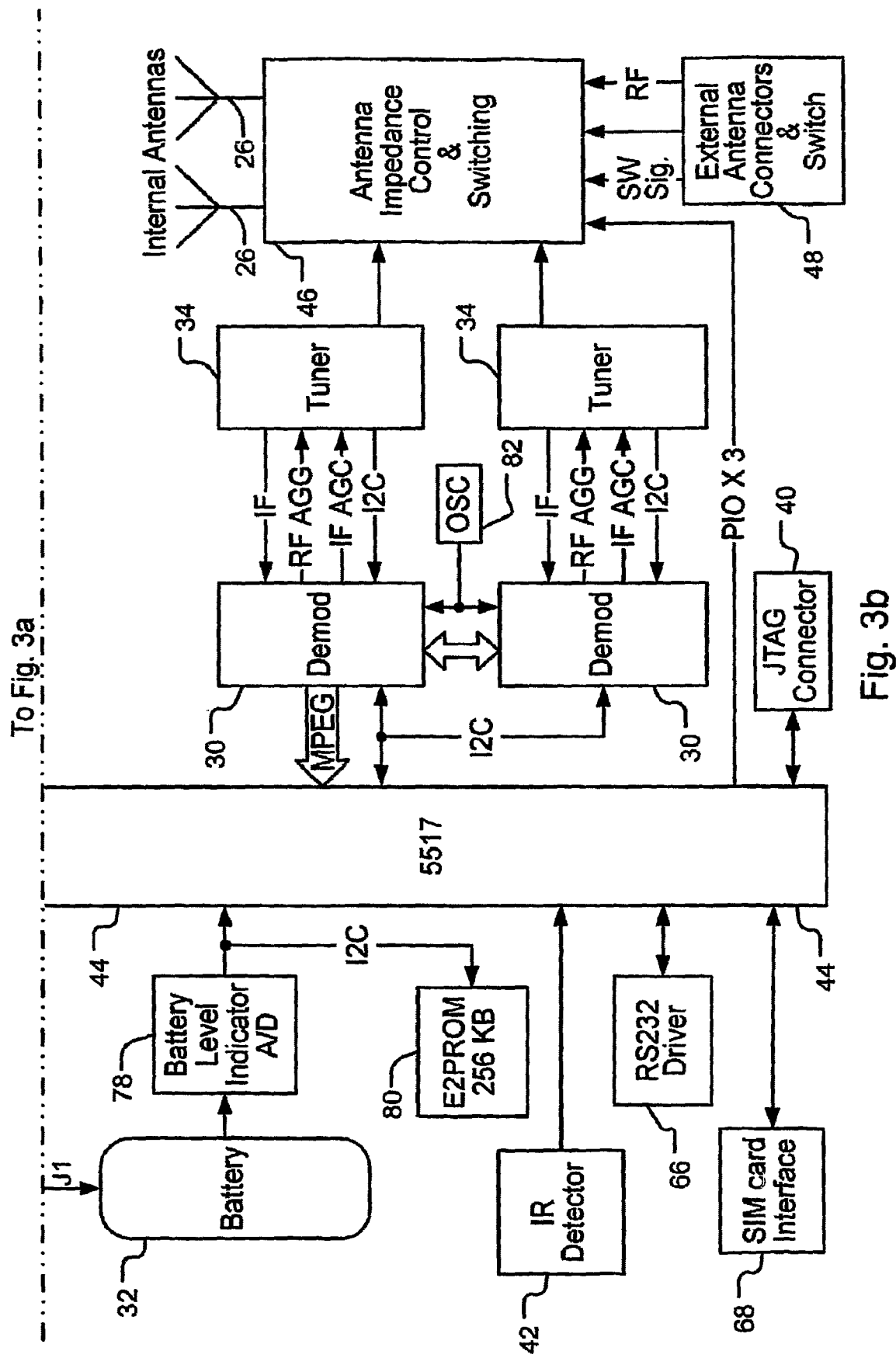

Referring now to FIG. 3, in a preferred embodiment of the present invention, a dual diversity demodulator 30 is provided that improves the carrier to noise ratio by 6-9 dB and has special Doppler compensation to allow it to work at high speeds. The dual diversity demodulator described herein allows provides a system in which two antennas are employed for reception and the signals from each are continually compared to determine which will give the best tuner performance. The present invention combines the functionality of a set-top box, two antennas 26, and LCD screen 28 into a small, mobile device measuring approximately 172 mm×88 mm×23 mm and weighing less then 500 grams.

The device includes a small, lightweight, battery operated with 2.5 hours of battery life, 4.3" widescreen LCD 28, dual diversity front end 30, 34 with sensitivity better than −90 dB, composite video output, internal speaker 36, stereo earphones 38, and dual external antenna jacks 40. The mobile device 20 is designed to operate at speeds up to 150 MPH in a vehicle, and is provided with hidden color LEDs 40, hidden IR window with remote control 42, power management software operated by on-board CPU 44, and has the ability to track SI data in a mobile environment. More preferably, a graphics renderer 46 is connected to the LCD screen 28 and CPU 44 and further receives demodulated MPEG, MPEG-2, MPEG-4 or other MPEG-like digital, video data which has been demodulated and decoded for display on the LCD screen 28. VSync and HSync signals, and a pixel clock are input to the renderer 46 from the CPU 44, and the renderer 28 outputs RGB information to the LCD screen 28. The renderer 28 also receives YUV data and Address Data from the CPU 44, and feeds back IRQ data to the CPU.

Antenna elements 26 are interfaced to an antenna impedance and control switch 46 which is further interfaced to an external antenna connector and switch 48. LCD screen 28 is controlled by LCD power control block 50, and the brightness of the LCD screen 28 is controlled by a brightness controller (LPF) 52.

CPU 44 outputs composite signal information and PIO data to a video filter 52, which further outputs composite video to an audio/video connector and switch 54. The switch 54 feeds back LCD switch signals to the CPU 44. CPU 44 also provides data to an audio amplifier and headphone driver circuit 56 which drives the headphone connector and switch circuit 38. The CPU 44 also optionally interfaces with a USB device through USB 2.0 port 58, although other compatible USB ports and other data I/O devices may also be adapted for use with the mobile devices of the present invention. A USB EEPROM interfaces to the USB port 58 through an I2C bus as shown. In further optional embodiments, the CPU 44 communicates with a FLASH memory 62 which temporarily stores programs or data, and also communicates with a SDRAM 64 which stores data. In yet further preferred embodiments of the mobile device taught and disclosed herein, an RS-232 interface 66 is optionally provided, and a SIM card interface 68 is provided.

LED control circuitry 70 controls the front panel button and LEDs 40. An RTC crystal 72 provides a clock signal to the CPU 44 to provide a master clock reference to the circuits in the mobile device. Front panel buttons and LEDs communicate bi-directionally through bus PIO X 5.

Similarly, battery 32 is managed by a power management and battery charge circuits block 74 which communicates with CPU 44 through VCXO and reset circuit block 76. The CPU also bi-directionally communicates with the power management and battery charge circuit block through bus PIO X 2. Battery 32 is further interfaced to a battery level indicator, an analog to digital converter (A/D) 78, to provide visual indications of the battery life. The battery level indicator 78 also bi-directionally communicates with the CPU 44, and is further interfaced to an E2ROM 80 through an I2C bus to assist in power management.

The tuning block comprising demodulators 30 and tuners 34 provides the mobile device with dual diversity tuning capabilities and discussed above. While the embodiment of FIG. 3 shows two demodulators 30 and two tuners 34, it should be recognized that the dual tuning function of the tuning block may actually be implemented by a single demodulator and a single tuner, or by multiple demodulators and tuners. Such other embodiments are preferably software controlled.

In a preferred operation of mobile devices in accordance with the present invention, the antenna elements 26 scan the mobile environment in which the device is traveling. The CPU 44 controls this process, and the signal strength at the two antenna elements 26 are continually compared to determine which will give the best tuner performance. Moreover, since the antenna elements are reticulatable as discussed above, they provide yet better signal reception as compared to prior, non-mobile set-top boxes. An oscillator 82 switches the demodulators 30 so that the control process run by CPU 44 can make this determination. Alternatively, the CPU 44 may utilize both demodulator and tuning circuits 30, 34 when desired. This may be done, for example, when the signal to both antenna elements is too weak to provide reception on individually from each antenna element 26, so it is desirable to use the signal from both antenna elements.

In whichever embodiment the mobile device operates, the demodulator 30 and tuners 30, 34 communicate IF, RF AGC, IF AGC, and data along an I2C bus. This is done as is conventional with typical digital composite data. In this manner, DVB-T signal can be received, tuned and demodulated so that the mobile device of the present invention can accurately, efficiently and clearly provide outputs to users.

Preferred methods of the present invention provide for operation of a receiver, by gathering data concerning parameters of an input signal, determining whether the signal is at a level, and performing additional functions if it is determined that the signal is at the level. More preferably, the invention is implemented in software, but the optionally, firmware, hard-wired software or other embodiments for running software on computers may be utilized. In still a further preferred embodiment one of the tuners 34, sometimes referred to herein as the "second tuner" scans the frequency space to gather data and assess the quality of potential signals that may be received by the system when the mobile device is not in diversity mode, that is there is adequate signal strength so that diversity mode operation is not required. The primary tuner is the other tuner 34 which is actually tuning the signal at the moment.

Figure 4:
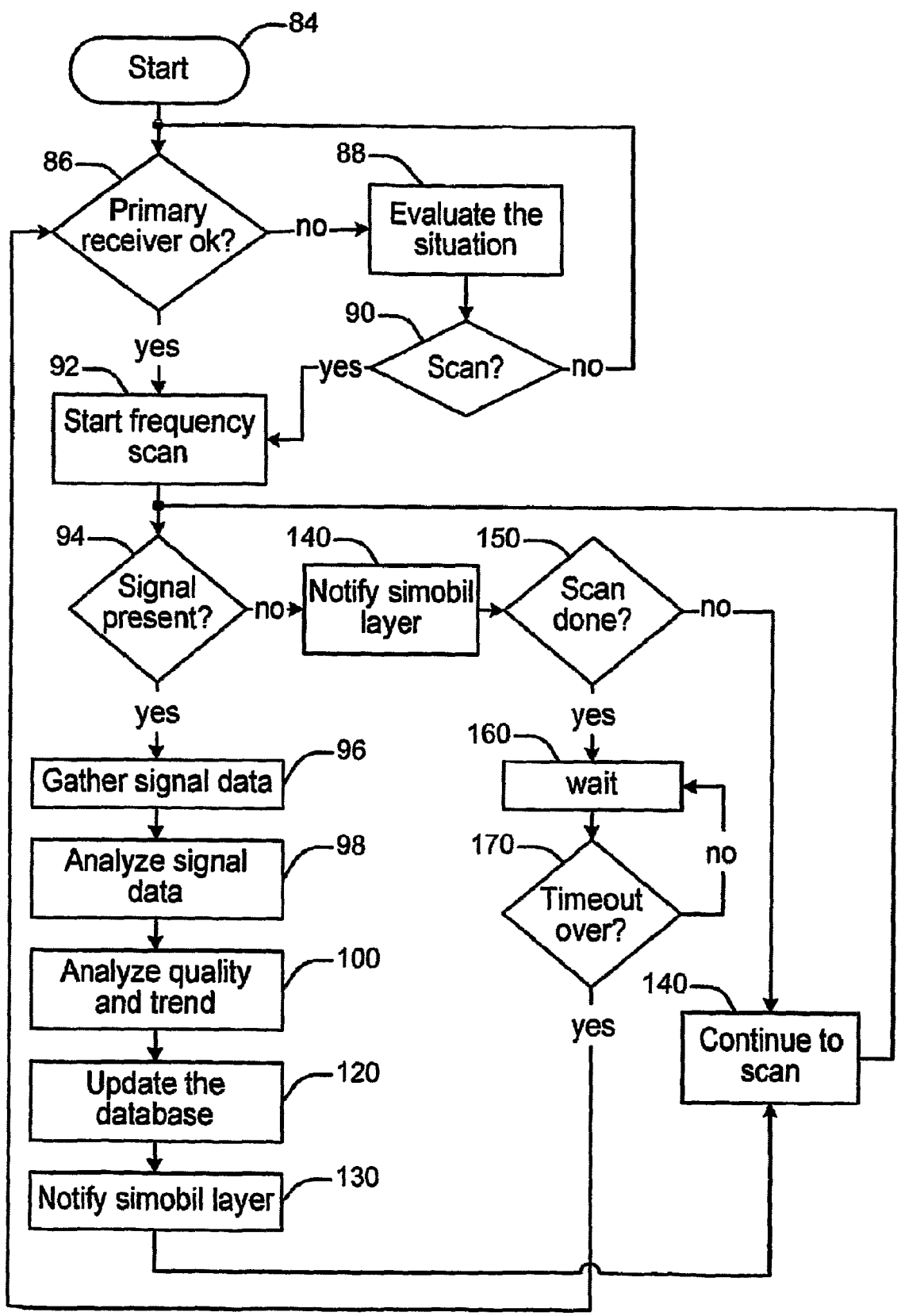
FIG. 4 is a flow chart of preferred methods in accordance with the present invention.

Referring to FIG. 4, a flow chart depicting a preferred method is illustrated. The method starts 84 by monitoring the signal of the primary tuner 86. If it is determined at 86 that the signal at the primary receiver is not adequate, then the method evaluates at 88 the signal strength, or other parameters, and it is then determined at 90 whether to engage in a frequency scan of the signal. If it is determined not to frequency scan the signal, then the method returns to step 86. If it is determined to start a frequency scan, then the frequency scan starts at 92, and it is determined whether there is signal present at the primary tuner 94.

If the second tuner is locked, the method proceeds to gather at step 96 data concerning parameters of the signal, for example, signal-to-noise ratio, bit error rate, signal strength and uncorrected packet count. Single parameters may be gathered or multiple combinations of parameters may be gathered. This data is gathered over a period of time such that there are preferably at least five readings or samples on each one of the parameters mentioned above prior to analyzing the data, however it may be feasible to use more or less than five samples. Next, the software proceeds to statistically analyze the data at step 98. This is preferably accomplished by determining the moving average on the signal-to-noise ratio, the signal strength and/or the bit error rate.

At step 100 a combination of the moving averages of the above parameters is used to determine the signal quality and/or trend of the signal coming into the primary tuner. If the signal quality is above a particular signal strength and signal-to-noise ratio, the signal is deemed to be "strong" or "good" (i.e. acceptable). Either one of these qualitative categorizations will enable the software to release the secondary tuner from other functions and allow it to scan the frequency space. Given that the signal into the primary receiver is acceptable, there should be little or no impact on the user experience. The only trade-off may be power consumption, as the secondary tuner will be fully powered-on to accomplish the scan. This trade-off exists only when the battery is used to provide power to the unit and not when external power is applied to the unit.

Next, the secondary tuner starts scanning at the lower end of the frequency spectrum. The frequency range is pre-determined and covers the upper part of the VHF range and the UHF range. At every frequency the secondary tuner attempts to lock to a signal. If a signal does not exist and the scan is not over, this is recorded in a database at step 120 to update information concerning and quality assessment metrics for each frequency scanned. This information is also passed on to the "simobil" layer of software at step 130 which makes use of this information to manage the services found in the frequencies scanned (transmitters). Again, when the tuner locks to a frequency, the software proceeds to gather data such as signal-to-noise ratio, bit error rate, signal strength and uncorrected packet count. This data is gathered over a period of time such that there are at least five readings on each one of the parameters mentioned above prior to analyzing the data.

The software proceeds to statistically determine the moving average on the signal-to-noise ratio, the signal strength and the bit error rate. A combination of the moving averages of the above parameters is used to determine the signal quality coming into the secondary receiver. A group of three moving averages is stored for each frequency so that a trend in signal quality can be predicted. For example, an upward trend in the signal-to-noise ratio moving average may indicate that the signal quality is improving. A downward trend the signal-to-noise ratio moving average may indicate that the signal quality is degrading over time. This information is used to assign a quality assessment value to the signal. This quality assessment value is stored in the database for that particular frequency. The software then proceeds to notify the "simobil" of the latest quality assessment value for that frequency. This information is crucial for the simobil layer to be able to manage the services efficiently. The scan continues in this manner until all the frequencies in the space have been searched.

At the point of scan completion, the second tuner is released from its scanning function and used for some of the other functions (power savings or diversity), and the "simobil" layer is so notified at step 140. Another scan takes place eventually at step 150 in order to once again assess the potential signals in the frequency space. Several factors are weighted by the software in order to determine the length of wait time at step 160 between scans. Among these factors is the quality of the signal coming into the primary receiver, and the amount of power savings that are desired when external power is not applied to the mobile receiver. The length of time between scans is therefore not fixed and can vary depending on how the software assesses the current circumstances. Once the timeout is over at step 170, the software continues the scan at step 180 and eventually goes back up to the starting point at steps 86, 92 and 94 to assess the condition of the signal going into the primary tuner.

The above occurs when the signal being acceptable prior to scanning. However, the possibility exists that it may not be acceptable in which case the software will decide whether to launch a scan or to wait. The factors influencing this decision are the time passed since the last scan, current condition of signal into primary receiver, whether external power is applied or not, and battery level.

There have thus been described certain preferred embodiments of mobile devices provided in accordance with the present invention. While preferred embodiments have been described and disclosed, it will be appreciated that modifications are within the true spirit and scope of the invention. The appended claims are intended to cover all such modifications.

The invention claimed is:

1. A method of operating a receiver which functions, at least at certain times, in diversity mode, comprising the steps of:
   gathering data concerning signal strength parameters of an input signal for signals that will be received by a plurality of antennas, each of the plurality of antennas being interfaced to a separate tuner which allows the receiver to function in diversity mode;
   determining whether the signal is at a level, strong enough to need less than all of the tuners to simultaneously operate such that the receiver may adequately tune the input signal; and
   performing additional functions if it is determined that the signal is at the level, to ensure that the receiver is not operating in diversity mode when the signal is at the level.

2. The method of claim 1, wherein the parameters gathered are chosen from the group consisting essentially of signal-to-noise ratio, bit error rate, signal strength and uncorrected packet count.

3. The method of claim 2, wherein the determining step comprises combining moving averages of the parameters to determine signal quality.

4. The method of claim 1 wherein the performing step comprises scanning a frequency space of the signal.

5. A mobile device, comprising a software module adapted for operating a receiver in the mobile device which functions, at least at certain times, in diversity mode, wherein the software module gathers data concerning signal strength parameters of an input signal for signals that will be received by a plurality of antennas, each of the plurality of antennas being interfaced to a separate tuner which allows the receiver to function in diversity mode, determining whether the signal is at a level, strong enough to need less than all of the tuners to simultaneously operate such that the receiver may adequately tune the input signal, and performing additional functions if it is determined that the signal is at the desired level, to ensure that the receiver is not operating in diversity mode when the signal is at the level.

6. The mobile device of claim 5, wherein the parameters gathered are chosen from the group consisting essentially of signal-to-noise ratio, bit error rate, signal strength and uncorrected packet count.

7. The mobile device of claim 6, wherein the device combines moving averages of the parameters to determine signal quality.

8. The mobile device of claim 5 wherein the device scans a frequency space of the signal to perform additional functions.

* * * * *